(12) United States Patent
Melanson et al.

(10) Patent No.: US 10,263,532 B2
(45) Date of Patent: Apr. 16, 2019

(54) MULTIPLE POWER SOURCES FOR A SWITCHING POWER CONVERTER CONTROLLER

(75) Inventors: John L. Melanson, Austin, TX (US); Eric J. King, Dripping Springs, TX (US)

(73) Assignee: SIGNIFY HOLDING B.V., Eindhoven (NL)

(*) Notice: Subject to any disclaimer, the term of this patent is extended or adjusted under 35 U.S.C. 154(b) by 1149 days.

(21) Appl. No.: 13/077,421

(22) Filed: Mar. 31, 2011

(65) Prior Publication Data

US 2012/0025608 A1 Feb. 2, 2012

Related U.S. Application Data

(60) Provisional application No. 61/369,202, filed on Jul. 30, 2010.

(51) Int. Cl.
  *H02M 3/22* (2006.01)
  *H02M 7/06* (2006.01)
  (Continued)

(52) U.S. Cl.
  CPC .............. *H02M 7/06* (2013.01); *H02M 1/36* (2013.01); *H02M 3/22* (2013.01); *H02M 3/33507* (2013.01); *H05B 33/0815* (2013.01); *H02M 2001/0006* (2013.01); *Y02B 20/346* (2013.01); *Y10T 307/352* (2015.04); *Y10T 307/50* (2015.04)

(58) Field of Classification Search
  CPC ....................................................... H02M 3/22
  USPC ................................................. 307/130, 139
  See application file for complete search history.

(56) References Cited

U.S. PATENT DOCUMENTS 4,683,529 A    7/1987   Bucher
4,692,853 A *  9/1987   de Sartre et al. ............... 363/49
(Continued)

FOREIGN PATENT DOCUMENTS

CN           1292598        4/2001
CN         201025693        2/2008
(Continued)

OTHER PUBLICATIONS

Amanci, Adrian et al, Synchronization System with Zero-Crossing Peak Detection Algorithm for Power System Applications, 2010 International Power Electronics Conference, pp. 2984-2991, 2010.
(Continued)

*Primary Examiner* — Adi Amrany

(57) ABSTRACT

An electronic system includes two power supplies to supply an operating voltage to a switching power converter. The first power supply, referred to as a start-up power supply, includes a first source follower transistor to conduct a start-up current for a controller and supply an operating voltage for the controller. The controller controls operation of the switching power converter. A second power supply, referred to as an auxiliary power supply, includes a second source follower transistor to conduct a steady-state operational current for the controller and supply an operating voltage for the controller. In at least one embodiment, once the second power supply begins supplying the operating voltage to the controller, the start-up power supply automatically ceases supplying the start-up current to the controller.

38 Claims, 5 Drawing Sheets

(51) Int. Cl.
  *H02M 1/36* (2007.01)
  *H05B 33/08* (2006.01)
  *H02M 3/335* (2006.01)
  *H02M 1/00* (2006.01)

(56) References Cited

U.S. PATENT DOCUMENTS

| | | | |
|---|---|---|---|
| 5,014,178 A * | 5/1991 | Balakrishnan | 363/49 |
| 5,200,886 A * | 4/1993 | Schwarz et al. | 363/49 |
| 5,285,369 A * | 2/1994 | Balakrishnan | H02M 1/36 323/901 |
| 5,319,301 A | 6/1994 | Callahan | |
| 5,321,350 A | 6/1994 | Haas | |
| 5,479,333 A | 12/1995 | McCambridge et al. | |
| 5,581,453 A * | 12/1996 | Ueta et al. | 363/49 |
| 5,770,928 A | 6/1998 | Chansky | |
| 5,812,383 A | 9/1998 | Majid et al. | |
| 5,812,385 A * | 9/1998 | Leu | 363/49 |
| 5,834,858 A | 11/1998 | Crosman et al. | |
| 5,874,725 A | 2/1999 | Yamaguchi | |
| 5,880,942 A * | 3/1999 | Leu | 363/49 |
| 5,901,051 A * | 5/1999 | Takahashi et al. | 363/21.18 |
| 6,043,635 A | 3/2000 | Downey | |
| 6,125,046 A | 9/2000 | Jang et al. | |
| 6,134,123 A * | 10/2000 | Yamada | 363/21.13 |
| 6,160,724 A | 12/2000 | Hemena et al. | |
| 6,181,114 B1 | 1/2001 | Hermena et al. | |
| 6,246,596 B1 * | 6/2001 | Yamazaki | 363/49 |
| 6,369,525 B1 | 4/2002 | Chin et al. | |
| 6,480,400 B2 * | 11/2002 | Wu et al. | 363/21.01 |
| 6,643,144 B2 | 11/2003 | Feldtkeller | |
| 6,646,848 B2 | 11/2003 | Yoshida et al. | |
| 6,839,247 B1 | 1/2005 | Yang et al. | |
| 6,842,353 B2 | 1/2005 | Yamada | |
| 6,912,140 B2 * | 6/2005 | Kasai et al. | 363/49 |
| 6,963,496 B2 | 11/2005 | Bimbaud | |
| 6,980,446 B2 | 12/2005 | Simada et al. | |
| 7,012,818 B2 | 3/2006 | Kotsuji et al. | |
| 7,064,531 B1 | 6/2006 | Zinn | |
| 7,099,163 B1 | 8/2006 | Ying | |
| 7,106,603 B1 | 9/2006 | Lin et al. | |
| 7,136,292 B1 | 11/2006 | Chan et al. | |
| 7,184,937 B1 | 2/2007 | Su | |
| 7,221,128 B2 * | 5/2007 | Usui et al. | 323/207 |
| 7,345,458 B2 | 3/2008 | Kanai et al. | |
| 7,352,595 B2 | 4/2008 | Yang et al. | |
| 7,394,668 B2 * | 7/2008 | Nakajima et al. | 363/21.04 |
| 7,394,670 B2 * | 7/2008 | Koike | 363/21.16 |
| 7,468,896 B2 | 12/2008 | Gong et al. | |
| 7,606,532 B2 | 10/2009 | Wuidart | |
| 7,684,223 B2 | 3/2010 | Wei | |
| 7,843,017 B2 * | 11/2010 | Cheng et al. | 257/392 |
| 8,008,898 B2 | 8/2011 | Melanson et al. | |
| 8,031,494 B2 * | 10/2011 | Brkovic | 363/49 |
| 8,169,801 B2 * | 5/2012 | Hsing | H01L 27/085 327/112 |
| 8,169,803 B2 * | 5/2012 | Huang et al. | 363/49 |
| 8,279,631 B2 * | 10/2012 | Yang | 363/20 |
| 8,305,001 B2 * | 11/2012 | Horiuchi et al. | 315/219 |
| 8,325,502 B2 * | 12/2012 | Giombanco et al. | 363/49 |
| 8,379,414 B2 * | 2/2013 | Huang et al. | 363/21.15 |
| 8,461,818 B1 * | 6/2013 | Benes | 323/282 |
| 2003/0174520 A1 | 9/2003 | Bimbaud | |
| 2004/0240233 A1 * | 12/2004 | Disney | 363/21.04 |
| 2005/0088862 A1 | 12/2005 | Shimada et al. | |
| 2006/0126368 A1 | 6/2006 | Rapeanu | |
| 2006/0285365 A1 | 12/2006 | Huynh et al. | |
| 2007/0103134 A1 | 5/2007 | Yang et al. | |
| 2007/0159856 A1 | 7/2007 | Ta-Yung | |
| 2008/0101098 A1 | 5/2008 | Disney | |
| 2008/0304293 A1 | 12/2008 | Constantin et al. | |
| 2009/0135632 A1 | 5/2009 | Sohma | |
| 2009/0190379 A1 | 7/2009 | Melanson et al. | |
| 2010/0213859 A1 | 8/2010 | Shteynberg et al. | |
| 2010/0271850 A1 * | 10/2010 | Huang et al. | 363/26 |
| 2010/0309689 A1 * | 12/2010 | Coulson | 363/16 |
| 2010/0327838 A1 | 12/2010 | Melanson | |
| 2011/0018590 A1 * | 1/2011 | Tai et al. | 327/103 |

FOREIGN PATENT DOCUMENTS

| | | |
|---|---|---|
| CN | 2012025693 | 2/2008 |
| EP | 0585789 A | 3/1994 |
| EP | 1289107 | 3/2003 |
| GB | 2468239 B | 5/2010 |
| WO | 2007016373 | 2/2007 |
| WO | 2010035155 | 1/2010 |

OTHER PUBLICATIONS

International Search Report and Written Opinion issued in related PCT Application No. PCT/US2011/046002 dated Nov. 17, 2011.

Power Integrations, TOP200-4/14 TOPSwitch Family Three-Terminal Off-Line PWM Switch, Product Datasheet, Power Integrations, Inc., Jul. 1996, XP02524650, San Jose, CA, USA url: http://www.datasheet4u.com/download.ph p?id=311789.

International Preliminary Report on Patentability and Written Opinion of the International Searching Authority, issued in the corresponding PCT Application No. PCT/US2011/046002 dated Feb. 5, 2013, 13 pages.

Kim, Tae-Hoon et al, A Low Cost Multiple Current-Voltage Concurrent Control for Smart Lighting Applications; IECON 2011—37th Annual Conference on IEEE Industrial Electronics Society; IEEE Nov. 7, 2011, pp. 2866-2871, Department of Electrical Engineering, Hyang University, Seoul, Korea.

Hu, Yue-Quan et al, Mathematical Modeling of Cross-Regulation Problem in Flyback Converters; 32nd Annual IEEE Power Electronics Specialists Conference; 2001 Conference Proceedings: Vancouver, Canada; IEEE; Jun. 17, 2001; pp. 2072-2077, Delta Power Electronics Center, Shanghai P. R. China.

Mammano, Bob, "Current Sensing Solutions for Power Supply Designs", pp. 1-36, 2001.

Power Integrations, Inc. TOP200-4/14 Datasheet, TOPSwitch Family Three-terminal Offline PWM Switch, pp. 1-16, 1994, Sunnyvale, CA, USA.

Zhang, Jun et al; A Novel Single Stage Power Factor Correction Scheme with Time-Multiplexing Control; Proceedings of the International Conference on Industrial Electronics Control and Instrumentation: Taipei, Taiwan; IEEE; Nov. 5, 2007; pp. 1432-1437; School of Electrical and Information Engineering; The University of Sydney, Australia.

Search Report, Application No. 2011800369650, The State Intellectual Property Office of the People's Republic of China, Oct. 15, 2014, pp. 1-2.

Second Office Action dated Sep. 11, 2015, mailed in Chinese Application No. 2011800369650, pp. 1-5, The State Intellectual Property Office of the People's Republic of China.

Search Report dated Sep. 1, 2015, mailed in Chinese Application No. 2011800369650, pp. 1-2, The State Intellectual Property Office of the People's Republic of China.

First Office Action dated Oct. 28, 2014, mailed in Chinese Application No. 2011800369650, pp. 1-11, The State Intellectual Property Office of the People's Republic of China.

Response to the Written Opinion as filed on Jan. 3, 2014, in European Patent Application No. 11743913.3, pp. 1-14, European Patent Office.

* cited by examiner

MULTIPLE POWER SOURCES FOR A SWITCHING POWER CONVERTER CONTROLLER

CROSS-REFERENCE TO RELATED APPLICATION

This application claims the benefit under 35 U.S.C. § 119(e) and 37 C.F.R. § 1.78 of U.S. Provisional Application No. 61/369,202, filed Jul. 30, 2010, and entitled "LED Lighting Methods and Apparatuses" and is incorporated by reference in its entirety.

BACKGROUND OF THE INVENTION

Field of the Invention

The present invention relates in general to the field of electronics, and more specifically to methods and systems of multiple power sources for a switching power converter controller.

Description of the Related Art

Many systems utilize integrated circuit controllers. Each controller generally operates from an alternating current (AC) or direct current (DC) power source. In some embodiments a higher voltage source, such as a 60 Hz/110 V line voltage in the United States of America or a 50 Hz/220 V line voltage in Europe, is available to supply power to the controller. However, the voltage requirements of the controller are generally significantly less than the available line voltage. Thus, for efficiency, the controller often receives power from an auxiliary power supply that supplies a voltage that more closely matches the maximum voltage requirements of the controller. However, the auxiliary power supply often generates power from the line voltage source and, thus, cannot begin delivering start-up power to the controller instantaneously. Accordingly, many controllers receive start-up power from the higher voltage source and fully or partially switch the auxiliary power source to deliver steady-state operating power.

FIG. 1 depicts an electronic system 100 that includes an IC controller 102 that controls delivery of power by switching power converter 104. Voltage source 106 supplies an alternating current (AC) input voltage $V_{IN}$ to a full bridge diode rectifier 108. The voltage source 106 is, for example, a public utility, and the AC voltage $V_{IN}$ is, for example, a 60 Hz/110 V line voltage in the United States of America or a 50 Hz/220 V line voltage in Europe. The full bridge rectifier 108 supplies a rectified AC voltage $V_X$ to the switching power converter 104. Capacitor 110 filters high frequency components from rectified voltage $V_X$.

Voltage source 112 supplies an initial start-up current $i_{SU}$ and an operating voltage $V_{DD}$. Voltage source 112 includes resistor 114 and capacitor 116. Resistor 114 is connected between node 118 at rectified voltage $V_X$ and node 120 and supplies a current path for the initial start-up current $i_{SU}$. The initial start-up current $i_{SU}$ charges capacitor 116, and capacitor 116 holds node 120 at a direct current (DC) operating voltage level $V_{DD}$.

When node 120 reaches the operating voltage level $V_{DD}$, controller 102 begins controlling switching power converter 104. Switching power converter 104 is a boost-type power converter that boosts the rectified voltage $V_X$ to generate a substantially DC link voltage $V_{LINK}$ across link capacitor 122. Link capacitor 122 supplies current to energize the primary coil 123 of transformer 125 when FET switch 127 conducts. To control the switching power converter 104, controller 102 generates switch control signal $C_0$ to control the conduction state of a field effect transistor (FET) switch 124. When switch 124 conducts, the inductor current $i_L$ energizes inductor 126. Diode 129 prevents link capacitor 122 from discharging through switch 124. When switch 124 stops conducting, inductor 126 discharges, and inductor current $i_L$ replenishes the charge on link capacitor 122 to maintain the link voltage $V_{LINK}$ at a substantially constant value. Controller 102 also generates switch control signal $C_1$ to control conductivity of switch 127, and, thus, control current flow into primary-side coil 123.

Transformer 125 includes two secondary-side coils. When the controller 102 begins controlling switching power converter 104 and switching power converter 104 begins generating the link voltage $V_{LINK}$ and energizing primary-side coil 123, secondary-side coil 128 supplies a load voltage $V_{LD}$ across capacitor 130 to load 132. Diode 133 prevents capacitor 130 from discharging through the secondary-side coil 128. Load 132 can be any type of load, such as a lighting system that includes any type of light source(s) such as one or more light emitting diodes (LEDs) or one or more fluorescent light sources, one or more motors, or one or more portable power sources.

Electronic system 100 includes an auxiliary power supply 133 that supplies power to controller 102 during steady-state operation. The auxiliary power supply 133 includes auxiliary coil 134, and auxiliary coil 134 represents the other secondary-side coil of transformer 125. Auxiliary coil 134 energizes when secondary-side coil 128 begins energizing. Auxiliary coil develops a voltage equal to the operating voltage $V_{DD}$ and supplies a post start-up, operating current $i_{PSU\_OP}$ to controller 102. The auxiliary power supply 133 also includes diode 136 and Zener diode 138. Diode 136 prevents reverse current flow into auxiliary coil 134, and Zener diode 138 maintains the voltage at node 120 at the operating voltage $V_{DD}$. In some embodiments of electronic systems 100, switching power converter 100 includes optional FET switch 140. Until the voltage across auxiliary coil 134 reaches the operating voltage $V_{DD}$, controller 102 generates switch control signal $C_2$ to cause switch 140 to conduct. When the voltage across auxiliary coil 134 reaches the operating voltage $V_{DD}$, controller 102 generates switch control signal $C_2$ to cause switch 140 to conduct and stop the start-up current $i_{SU}$ through resistor 114.

Electronic system 100 has several inefficiencies. For example, without switch 140, the start-up current $i_{SU}$ continues to flow through resistor 114 when the auxiliary coil 134 is energized and supplying current $i_{PSU\_OP}$. Current flow through resistor 114 generates power losses equal to the square of start-up current $i_{SU}$ times the resistance value of resistor 114. If electronic system 100 includes switch 140, controller 102 includes extra, well-known complexity to generate the control signal $C_2$. Additionally, switch 140 is generally a high voltage FET, which is more expensive than a low voltage FET.

SUMMARY OF THE INVENTION

In one embodiment of the present invention, an apparatus includes a first power supply having a first source follower transistor to conduct a start-up current for a controller and supply an operating voltage for the controller. The apparatus further includes a second power supply having a second source follower transistor to conduct a steady-state operational current for the controller and supply an operating voltage for the controller.

In another embodiment of the present invention, a method includes supplying a start-up current for a controller and supplying an operating voltage for the controller from a first power supply having a first source follower transistor to conduct the start-up current. The method further includes supplying a steady-state operational current for the controller and supplying an operating voltage for the controller from a second power supply having a second source follower transistor to conduct the steady-state operational current.

In a further embodiment of the present invention, an apparatus includes a switching power converter and a a controller coupled to the switching power converter to control operation of the switching power converter. The apparatus also includes a first power supply having a first source follower transistor to conduct a start-up current for the controller and supply an operating voltage for the controller. The apparatus further includes a second power supply having a second source follower transistor to conduct a steady-state operational current for the controller and supply an operating voltage for the controller.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An electronic system includes two power supplies to supply an operating voltage to a switching power converter. The first power supply, referred to as a start-up power supply, includes a first source follower transistor to conduct a start-up current for a controller and supply an operating voltage for the controller. The controller controls operation of the switching power converter. A second power supply, referred to as an auxiliary power supply, includes a second source follower transistor to conduct a steady-state operational current for the controller and supply an operating voltage for the controller. In at least one embodiment, once the second power supply begins supplying the operating voltage to the controller, the start-up power supply automatically ceases supplying the start-up current to the controller. Thus, in at least one embodiment, components of the start-up power supply do not dissipate power and, therefore, do not present power losses in the electronic system during steady state operation.

In at least one embodiment, the controller controls a source of the first source follower transistor to control the switching power converter. In at least one embodiment, the first and second source follower transistors are field effect transistors, and the gates of the first and second FET transistors are biased by the same gate voltage. In at least one embodiment, the second transistor is a low voltage FET, and the controller controls operation of the second transistor to regulate the operating voltage. In at least one embodiment, the second transistor is more efficient than a conventional Zener diode that regulates an operating voltage.

DEFINITION. A source follower transistor is a transistor whose conductivity is controlled by a feature of the transistor that supplies electrons. For example, a FET includes gate, drain, and source features. The FET is a source follower when a bias of the source of the FET controls conductivity of the FET. For example, a bipolar junction transistor (BJT) includes base, collector, and emitter features. In at least one embodiment, the BJT is a source follower when a bias of the emitter of the BJT controls conductivity of the BJT.

Figure 1:
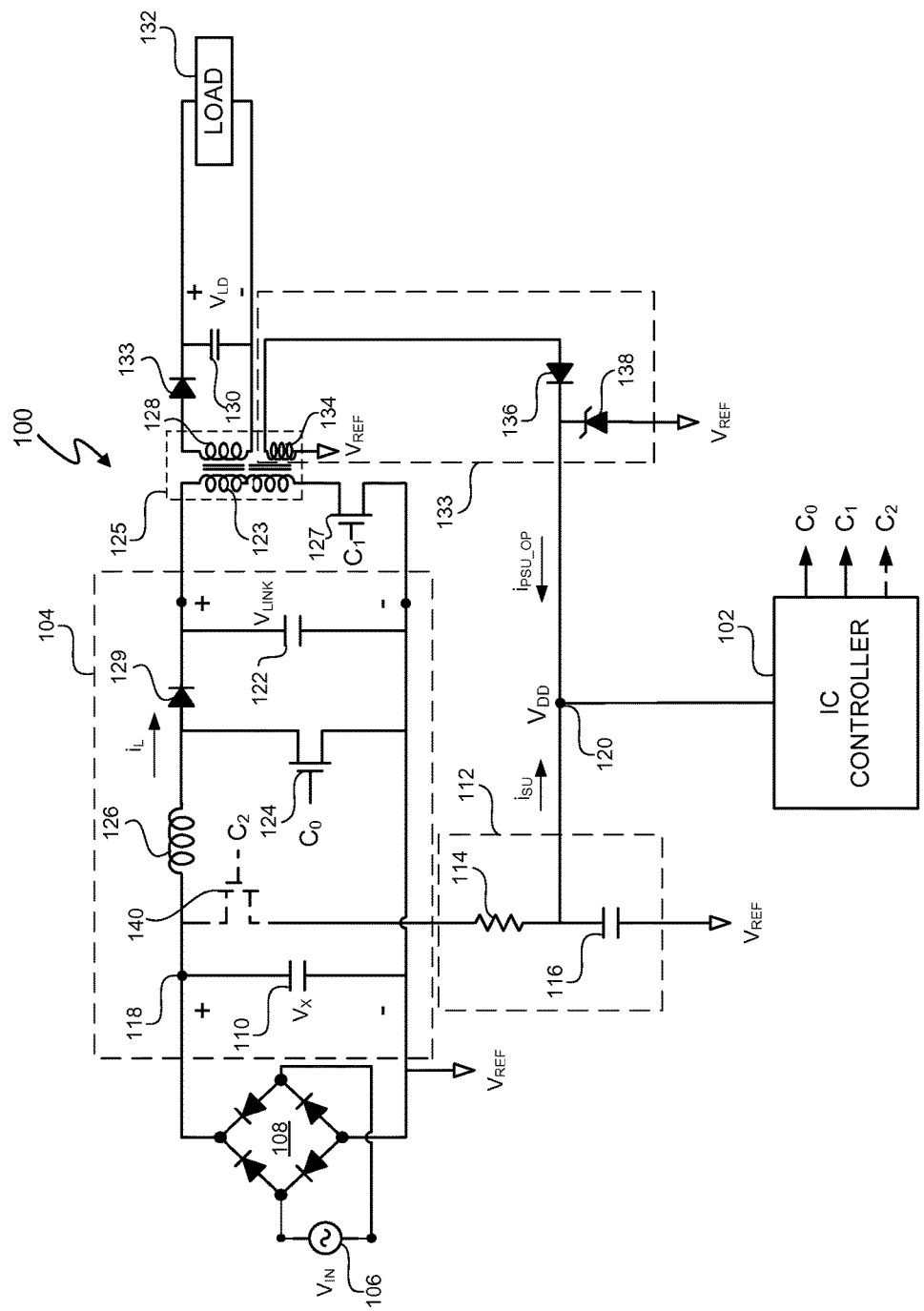
FIG. 1 (labeled prior art) depicts an electronic system having two voltage sources for supplying power to a switching power converter controller.
Figure 2:
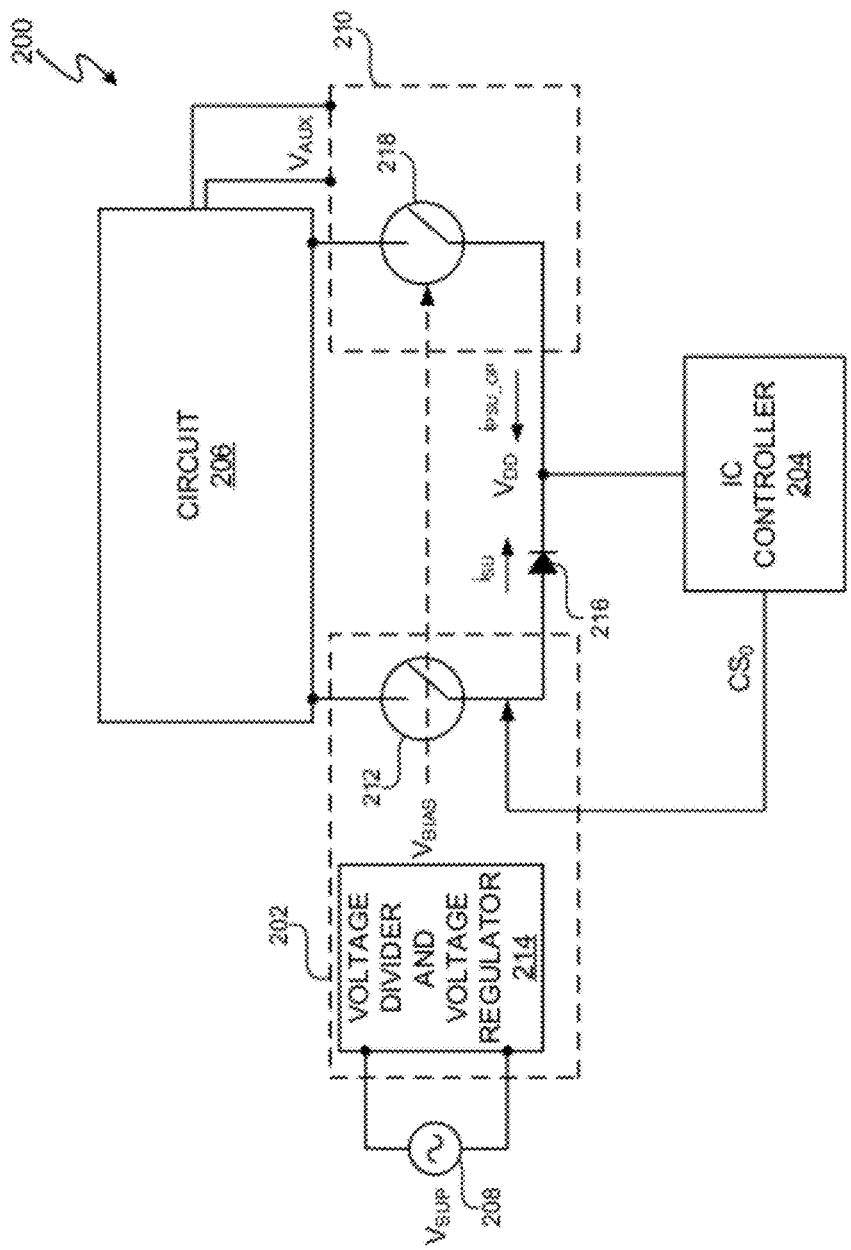
FIG. 2 depicts an electronic system having two voltage sources with source-follower transistors for supplying power to a switching power converter controller.

FIG. 2 depicts an electronic system 200 having a start-up power supply 202 to supply power to integrated circuit (IC) controller 204 during start-up of the controller 204. "Start-up" is a phase of the operation of controller 204 during which controller 204 initializes and begins to operate and control circuit 206. In at least one embodiment, circuit 206 is a switching power converter, such as a boost converter, buck converter, boost-buck converter, or a Cúk converter. The start-up power supply 202 receives power from a voltage supply 208 that supplies a supply voltage $V_{SUP}$. Voltage supply 208 can be any type of AC or DC voltage supply. In at least one embodiment, voltage supply 208 is a rectified line voltage source that generates a voltage identical to rectified voltage $V_X$ of FIG. 1. In at least one embodiment, voltage supply 208 is a battery.

Electronic system 200 also includes an auxiliary power supply 210 to supply power to controller 204 during post start-up operations of controller 204. "Post start-up operations" of controller 204 can also be referred to as "steady state" operations and refer to a phase of the operation of controller 204 when controller 204 is controlling circuit 206 and auxiliary power supply 210 is able to obtain a sufficient auxiliary operating voltage $V_{AUX}$ from circuit 206 to supply an operating voltage $V_{DD}$ to controller 204.

During start-up of controller 204, voltage supply 208 begins supplying the supply $V_{SUP}$ to start-up power supply 202. Start-up power supply 202 includes a source follower transistor 212, such as a FET or BJT. During start-up of controller 204, voltage divider and voltage regulator 214 and source follower transistor 212 conduct a start-up current $i_{SU}$ through diode 216 and supply the operating voltage $V_{DD}$ to controller 204. The voltage divider and voltage regulator 214 step down the supply voltage $V_S$ to bias source follower transistor 212 with the voltage $V_{BIAS}$. During post start-up operations, controller 204 generates a control signal $CS_0$ to control a source of source follower transistor 212 to control operation of circuit 206. An exemplary controller to control the source follower transistor 212 is described in U.S. patent application Ser. No. 12/495,457, filed on Jun. 30, 2009, entitled Cascode Configured Switching Using At Least One Low Breakdown Voltage Internal, Integrated Circuit Switch To Control At Least One High Breakdown Voltage External Switch, inventor John L. Melanson, and assignee Cirrus Logic, Inc. U.S. patent application Ser. No. 12/496,457, referred to herein as Melanson I, is hereby incorporated by reference in its entirety. In at least one embodiment, the gates of FET based source follower transistors 212 and 218 share a common bias voltage $V_{BIAS}$ and, in at least one embodiment, are connected together. In at least one embodiment, the bases of BJT based source follower transistors 212 and 218 also share a common bias voltage $V_{BIAS}$ and, in at least one embodiment, are connected together.

When controller 204 begins to control circuit 206, circuit 206 supplies an auxiliary voltage $V_{AUX}$ to auxiliary power supply 210. Auxiliary power supply 210 also includes a source follower transistor 218 to conduct a steady state, post start-up operating current $i_{PSU\_OP}$ and supply the operating voltage $V_{DD}$ to controller 204. In at least one embodiment, once the auxiliary power supply 210 begins supplying the operating voltage $V_{DD}$ to the controller 204, the start-up power supply 202 ceases supplying the start-up current $i_{SU}$ to the controller 204. By ceasing operation, start-up power supply 202 prevents any power losses that can occur during operation of start-up power supply 202.

Figure 3:
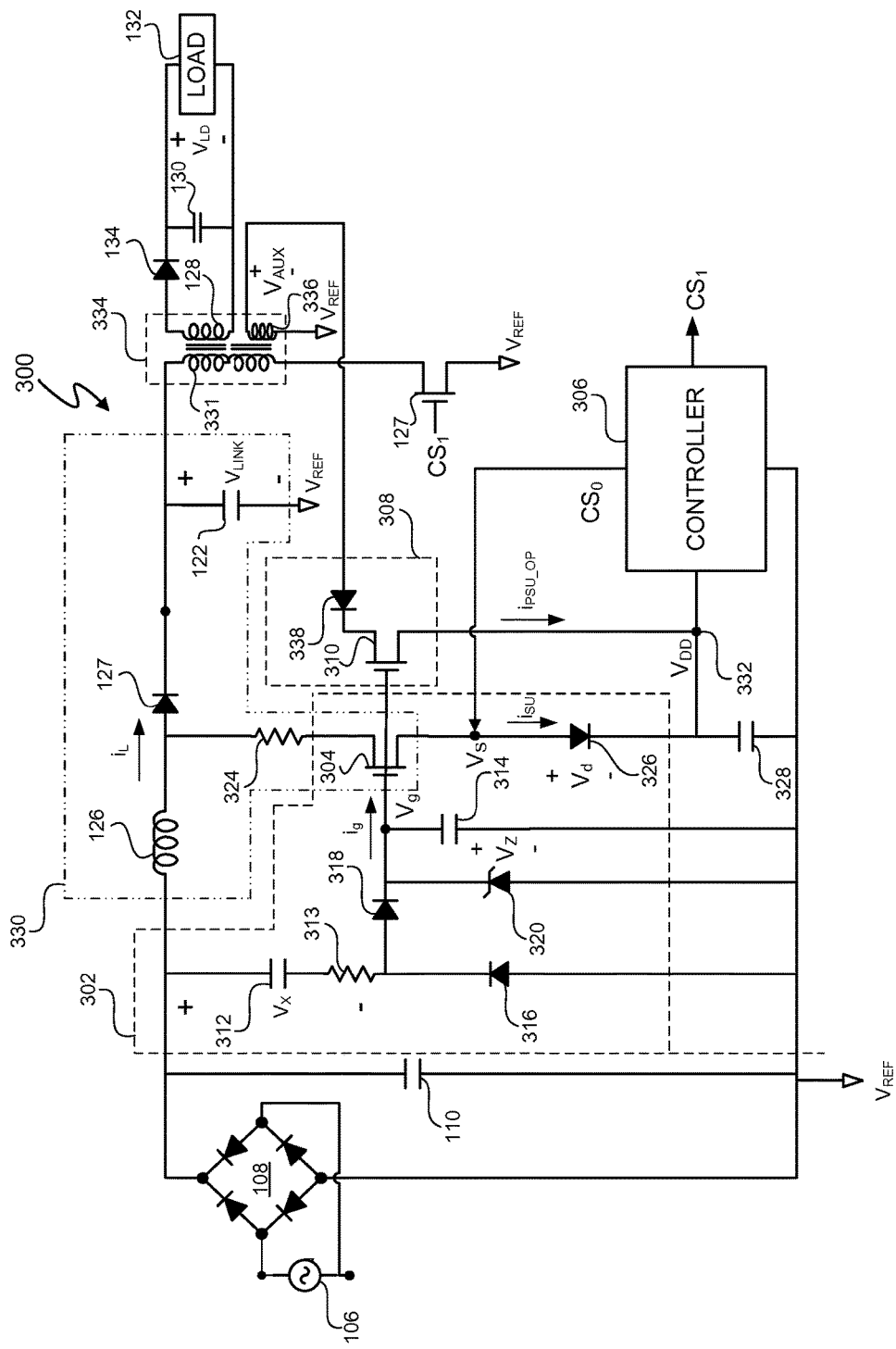
FIG. 3 depicts an embodiment of the electronic system of FIG. 2.

FIG. 3 depicts an electronic system 300, which represents one embodiment of electronic system 200. As subsequently described in more detail, electronic system 300 includes a start-up power supply 302, which includes a source follower FET 304, to conduct a start-up current $i_{SU}$ for a controller 306 and supply an operating voltage $V_{DD}$ for the controller 306. Electronic system 300 also includes an auxiliary power supply 308, which includes a source follower FET 310, to conduct a steady-state operational current $i_{PSU\_OP}$ for the controller 306 and, in at least one embodiment, regulate the operating voltage $V_{DD}$ for the controller 306. In at least one embodiment, controller 306 is identical controller 204.

Voltage source 106, rectifier 108, and capacitor 110 function as described with reference to FIG. 1 to generate the rectified voltage $V_X$. Capacitors 312 and 314 establish a voltage divider to set a gate bias voltage $V_g$ for FET 304. In at least one embodiment, the particular capacitance values of capacitors 312 and 314 are a matter of design choice. In at least one embodiment, the capacitance of capacitor 312 is 22-47 nF, and the capacitance of capacitor 314 is 47 nF. Resistor 313 has a resistance in the range of, for example, 1 kohm to 20 kohm. Resistor 313 shapes the start-up current $i_g$ charging capacitor 314 and limits peak start-up current $i_{SU}$. Diode 316 prevents the gate current $i_g$ from being conducted to the voltage reference $V_{REF}$, such as a ground reference. The gate current $i_g$ is conducted through diode 318, which prevents reverse current flow of the gate current $i_g$, to the gate of source follower FET 304. Zener diode 320 clamps the gate of source follower FET 304 to the gate voltage $V_g$.

The gate bias voltage $V_g$ minus the source voltage $V_S$ of FET 304 exceeds a threshold voltage of FET 304. FET 304 conducts the start-up current $i_{SU}$ through resistor 324, FET 304, and diode 326 to charge capacitor 328 to the operating voltage $V_{DD}$. The capacitance of capacitor 328 is, for example, 10 µF. At start-up, the operating voltage $V_{DD}$ across capacitor 328 equals the Zener voltage $V_Z$ minus the threshold voltage $V_{T304}$ of FET 304 minus the diode voltage $V_d$ across diode 326, i.e. at start-up $V_{DD}=V_Z-V_{T304}-V_d$. FET 304 is a high voltage FET that is used to control boost-type switching power converter 330, and the threshold voltage $V_{T304}$ of FET 304 is, for example, approximately 3V. FET 304 is included in both the start-up power supply 302 and switching power converter 330.

When the voltage at node 332 reaches the operating voltage $V_{DD}$, controller 306 initializes and begins generating the switch control signal $CS_0$ as described in, for example, Melanson I. Once controller 306 begins generating switch control signal $CS_0$, switching power converter 330 generates the link voltage $V_{LINK}$ across link capacitor 122 as described with reference to switching power converter 104 (FIG. 1).

The link voltage $V_{LINK}$ energizes the primary-side coil 331 of transformer 334 and induces a load voltage $V_{LD}$ via secondary-side coil 128 for load 132 as described with reference to the electronic system 100 (FIG. 1). The primary-side coil 331 also induces an auxiliary voltage $V_{AUX}$ in secondary-side coil 336. The auxiliary voltage $V_{AUX}$ causes the steady state, post start-up operating current $i_{PSU\_OP}$ to flow through diode 338 and source follower FET 310 to capacitor 328. The gates of FETs 304 and 310 are connected together. Thus, once FET 310 begins conducting, controller 306 enters post-start-up operation, and the operating voltage $V_{DD}$ equals the Zener voltage $V_Z$ minus the threshold voltage $V_{T310}$, i.e. during post start-up operation, $V_{DD}=V_Z-V_{T310}$. Source follower-FET 310 is a low voltage FET, and, thus, the threshold voltage $V_{T310}$ is less than the threshold voltage $V_{T304}$ of source follower FET 304. The threshold voltage $V_{T310}$ is, for example, approximately 2V, and, as previously mentioned, the threshold voltage $V_{T304}$ of FET 304 is, for example, approximately 3V. Thus, the ratio of $V_{T310}$ to $V_{T304}$ is, in at least one embodiment, 2:3. Since the gates of FETs 304 and 310 are connected and biased by gate $V_g$, during post start-up operation, $V_{DD}>V_Z-(V_{T304}-V_d)$, the FET 304 stops conducting, diode 326 stops conducting, i.e. is reversed biased, start-up power supply 302 ceases operation, and the start-up current $i_{SU}$ ceases.

During post start-up operation, FET 310 has a source-drain energy loss. However, the source-drain loss of FET 310 is generally less than an energy loss of Zener diode 138 (FIG. 1). Additionally, in at least one embodiment, electronic system 300 does not have a high voltage FET, such as FET 140, to shut off start-up power supply 302 once the auxiliary power supply 308 begins supplying the steady state, post start-up operating current $i_{PSU\_OP}$ and supplying the operating voltage $V_{DD}$. Since the auxiliary voltage $V_{AUX}$ is a lower voltage than the supply voltage $V_{SUP}$, supplying the operating voltage $V_{DD}$ from the auxiliary voltage $V_{AUX}$ is more efficient than supplying the operating voltage from the rectified supply voltage $V_X$. Link capacitor 122 supplies current to energize the primary coil 332 of transformer 334 when FET switch 127 conducts. Controller 306 also generates switch control signal $CS_1$ to control conductivity of switch 127, and, thus, control current flow into primary-side coil 332.

Figure 4:
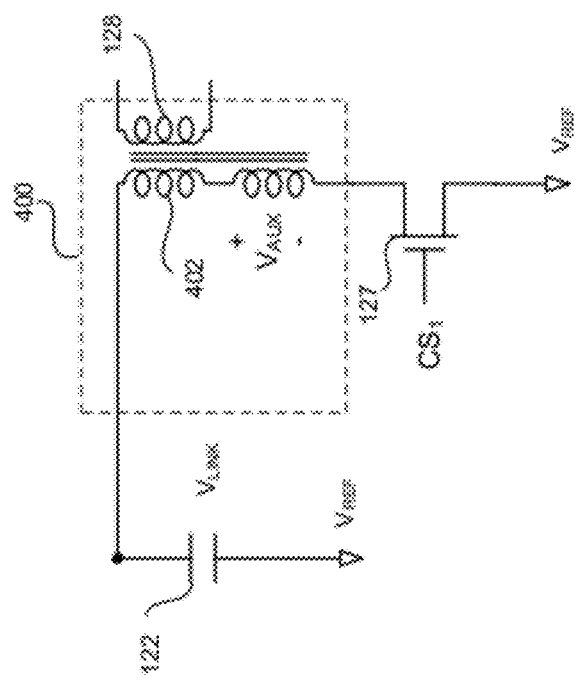
FIG. 4 depicts an embodiment of a transformer for use in the electronic system of FIG. 3.

FIG. 4 depicts transformer 400. Transformer 400 generates the auxiliary voltage $V_{AUX}$ using a primary side coil 402. Transformer 400 can be substituted for transformer 334 in electronic system 300 (FIG. 3). Substituting transformer 400 for transformer 334 allows the primary-side coil 133 to transfer energy to the secondary-side coil 128 without transferring energy to the auxiliary coil 404 and, thus, taking power from the load 132.

Figure 5:
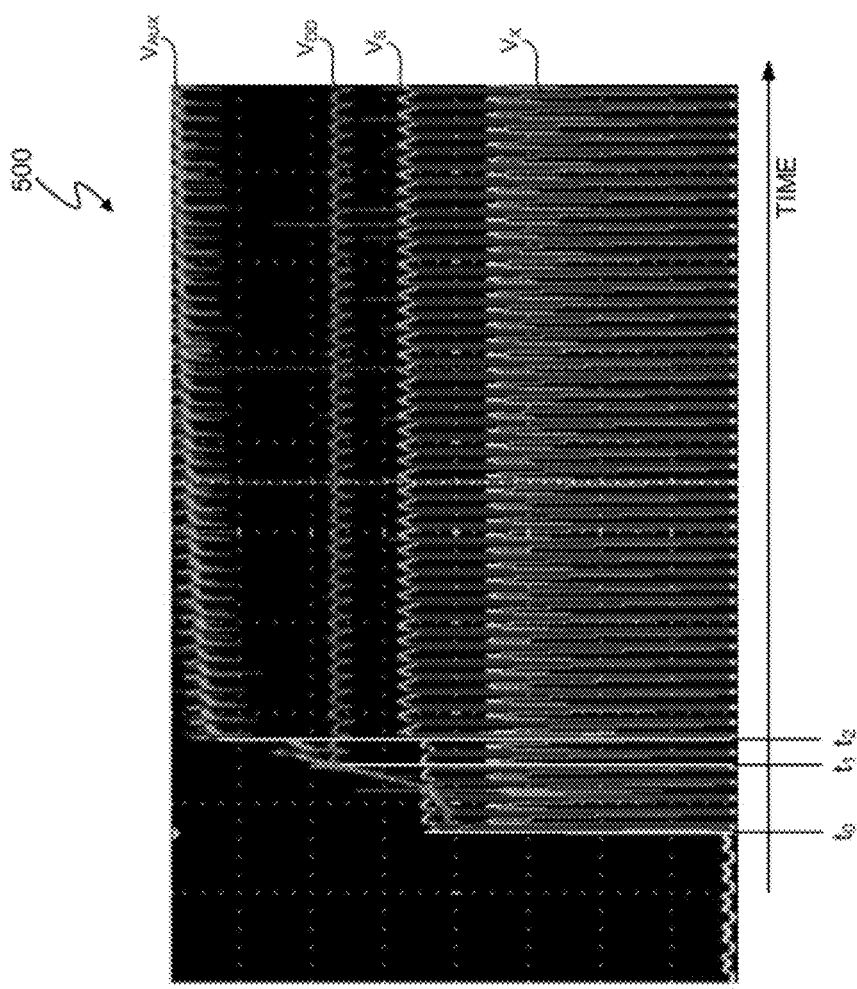
FIG. 5 depicts exemplary, superimposed operating voltage waveforms for the electronic system of FIG. 3.

FIG. 5 depicts exemplary, superimposed operating voltage waveforms for electronic system 300. Referring to FIGS. 3 and 5, at time $t_0$, the rectified voltage $V_X$ activates, and the start-up current $i_{SU}$ generated by start-up power supply 302 causes the gate voltage $V_g$ to cause FET 304 to conduct. Once FET 304 begins conducting at time $t_0$, capacitor 328 begins charging from time $t_0$ to time $t_1$ to raise the voltage at node 332 to operating voltage $V_{DD}$. Between times $t_1$ and $t_2$, controller 306 begins controlling switching power converter 330. At time $t_2$, the switching power converter 330 generates the auxiliary voltage $V_{AUX}$. The auxiliary voltage $V_{AUX}$ then causes steady state, post start-up operating current $i_{PSU\_OP}$ to flow to node 332 and maintain the voltage across capacitor 328 at the operating voltage $V_{DD}$. Also at time $t_2$, the source voltage $V_S$ of FET 304 rises, thus causing the start-up current $i_{SU}$ to stop flowing and start-up power supply 302 to cease operation. The controller 306 then controls the source voltage $V_S$ of FET 304 to control operation of the switching power converter 330 as, for example, described in Melanson I.

Thus, a start-up power supply and an auxiliary power supply each include source follower transistors to supply an operating voltage $V_{DD}$ and respectively supply a start-up current and a steady state, post start-up operating current. During post start-up operation, the start-up power supply ceases operation, thus, reducing losses associated with the start-up power supply. Additionally, in at least one embodiment, the start-up power supply does not include a high voltage FET, thus, reducing cost. Additionally, in at least one embodiment, the auxiliary power supply includes a low voltage FET that incurs smaller energy losses than a conventional Zener diode.

Although embodiments have been described in detail, it should be understood that various changes, substitutions, and alterations can be made hereto without departing from the spirit and scope of the invention as defined by the appended claims.

What is claimed is:

1. An apparatus comprising:
a first power supply having a first source follower transistor to conduct a start-up current for a controller and supply an operating voltage for the controller; and
a second power supply having a second source follower transistor to conduct a steady-state operational current for the controller and supply an operating voltage from a supply node for the controller, wherein a source of the first source follower transistor and a source of the second source follower transistor are coupled to the supply node and, during operation of the apparatus, when the source of the second source follower transistor is biased with the operating voltage at the supply node to cause the second source follower transistor to turn ON, the second source follower transistor changes the operating voltage and the change in the operating voltage at the supply node causes the first source follower transistor to automatically turn OFF.

2. The apparatus of claim 1 wherein the first and second source follower transistors are field effect transistors.

3. The apparatus of claim 2 wherein a gate of the first source follower transistor is connected to a gate of the second source follower transistor.

4. The apparatus of claim 1 wherein first and second transistors are bipolar junction transistors.

5. The apparatus of claim 1 further comprising:
a switching power converter; and
the controller, coupled to the switching power converter, to control operation of the switching power converter.

6. The apparatus of claim 1 wherein the first power supply includes a voltage divider to supply an operational voltage to the controller during a start-up period of the controller.

7. The apparatus of claim 6 wherein the voltage divider comprises a plurality of series coupled capacitors.

8. The apparatus of claim 1 wherein the second power supply comprises an auxiliary winding of a transformer.

9. The apparatus of claim 1 wherein:
when the second power supply supplies the operating voltage to the controller, the first power supply automatically ceases supplying the start-up current to the controller and the operating voltage is determined from a member of a group consisting of: (1) a gate voltage of the second source follower minus a threshold voltage of the second source follower and (2) a base voltage of the second source follower minus a base-to-emitter junction voltage of the second source follower;
when the operating voltage is determined by the gate voltage minus the threshold voltage of the second source follower, the operating voltage causes a gate to source voltage of the first source follower transistor to decrease below a threshold voltage of the first source follower transistor; and
when the operating voltage is determined by the base voltage minus the base-to-emitter junction voltage of the second source follower, the operating voltage causes a base-to-emitter voltage of the first source follower transistor to decrease below a base-to-emitter voltage that allows the first source follower transistor to conduct.

10. The apparatus of claim 1 wherein the second source follower transistor conducts current to supply the operating voltage from the second power supply.

11. The apparatus of claim 1 wherein:
the first power supply is configured so that during operation of the apparatus when the second source follower transistor conducts the steady-state operational current, a gate to source voltage of the first source follower transistor is reduced below a threshold voltage of the first source follower transistor when the second source follower transistor changes the operating voltage to cause the first source follower transistor to cease conducting and the operating voltage is determined from a member of a group consisting of: (1) a gate voltage of the second source follower minus a threshold voltage of the second source follower and (2) a base voltage of the second source follower minus a base-to-emitter junction voltage of the second source follower;
when the operating voltage is determined by the gate voltage minus the threshold voltage of the second source follower, the operating voltage causes a gate to source voltage of the first source follower transistor to decrease below a threshold voltage of the first source follower transistor; and
when the operating voltage is determined by the base voltage minus the base-to-emitter junction voltage of the second source follower, the operating voltage causes a base-to-emitter voltage of the first source follower transistor to decrease below a base-to-emitter voltage that allows the first source follower transistor to conduct.

12. The apparatus of claim 11 wherein the threshold voltage of the first source follower transistor is greater than a threshold voltage of the second source follower transistor, which ensures that the first source follower transistor turns OFF when the second source follower transistor turns ON.

13. The apparatus of claim 11 further comprising a circuit element coupled to a source of the first source follower transistor, and, during operation of the apparatus, a voltage drop across the circuit element at least assists to cause the first source follower transistor to cease conducting.

14. The apparatus of claim 1 wherein gates of the first and second source follower transistors have an identical bias voltage during operation of the apparatus.

15. The apparatus of claim 1, wherein the operating voltage for the controller is a regulated, direct current (DC) voltage.

16. The apparatus of claim 1 further comprising a diode coupled between the source of the first source follower and the supply node.

17. A method comprising:
supplying a start-up current for a controller and supplying an operating voltage for the controller from a first power supply having a first source follower transistor to conduct the start-up current; and
supplying a steady-state operational current for the controller and supplying an operating voltage from a supply node for the controller from a second power supply having a second source follower transistor to conduct the steady-state operational current, wherein a source of the first source follower transistor and a source of the second source follower transistor are coupled to the supply node and supplying the operating voltage from the supply node further comprises:
 biasing the source of the second source follower transistor with the operating voltage at the supply node to cause the second source follower transistor to turn ON, wherein the second source follower transistor changes the operating voltage and the change in the operating voltage at the supply node causes the first source follower transistor to automatically turn OFF.

18. The method of claim 17 wherein the first and second source follower transistors are field effect transistors.

19. The method of claim 18 wherein a gate of the first transistor is connected to a gate of the second transistor.

20. The method of claim 17 wherein first and second transistors are bipolar junction transistors.

21. The method of claim 17 further comprising:
 controlling operation of a switching power converter.

22. The method of claim 17 further comprising:
 supplying an operational voltage to the controller during a start-up period of the controller using a voltage divider to divide a supply voltage supplied to the first power supply.

23. The method of claim 22 wherein the voltage divider comprises a plurality of series coupled capacitors.

24. The method of claim 17 wherein supplying a steady-state operational current for the controller and supplying an operating voltage for the controller from a second power supply comprises:
 receiving an auxiliary supply voltage from an auxiliary winding of a transformer.

25. The method of claim 17 further comprising:
 automatically ceasing supplying the start-up current to the controller from the first power supply when the second power supply supplies the operating voltage to the controller and the operating voltage is determined from a member of a group consisting of: (1) a gate voltage of the second source follower minus a threshold voltage of the second source follower and (2) a base voltage of the second source follower minus a base-to-emitter junction voltage of the second source follower;
 wherein:
  when the operating voltage is determined by the gate voltage minus the threshold voltage of the second source follower, the operating voltage causes a gate to source voltage of the first source follower transistor to decrease below a threshold voltage of the first source follower transistor; and
  when the operating voltage is determined by the base voltage minus the base-to-emitter junction voltage of the second source follower, the operating voltage causes a base-to-emitter voltage of the first source follower transistor to decrease below a base-to-emitter voltage that allows the first source follower transistor to conduct.

26. The method of claim 17 further comprising:
 conducting current with the second source follower transistor to supply the operating voltage from the second power supply.

27. The method of claim 17 wherein the first and second source follower transistors are field effect transistors and during supplying the steady-state operational current for the controller and supplying the operating voltage for the controller from the second power supply, the method further comprises:
 reducing a gate to source voltage of the first source follower transistor below a threshold voltage of the first source follower transistor to cause the first source follower transistor to cease conducting.

28. The method of claim 27 wherein the threshold voltage of the first source follower transistor is greater than a threshold voltage of the second source follower transistor, which ensures that the first source follower transistor turns OFF when the second source follower transistor turns ON.

29. The method of claim 27 wherein to reduce the gate to source voltage of the first source follower transistor to cause the first source follower transistor to cease conducting, the method further comprising:
 generating a voltage drop across a circuit element coupled to a source of the first source follower transistor to at least assist in causing the first source follower transistor to cease conducting.

30. The method of claim 17 further comprising:
 biasing gates of the first and second source follower transistors with an identical bias voltage.

31. The method of claim 17, wherein the operating voltage for the controller is a regulated, direct current (DC) voltage.

32. The method of claim 17 wherein a diode is coupled between the source of the first source follower and the supply node.

33. An apparatus comprising:
 a switching power converter,
 a controller coupled to the switching power converter to control operation of the switching power converter;
 a first power supply having a first source follower transistor to conduct a start-up current for the controller and supply an operating voltage for the controller; and
 a second power supply having a second source follower transistor to conduct a steady-state operational current for the controller and supply an operating voltage from a supply node for the controller, wherein a source of the first source follower transistor and a source of the second source follower transistor are coupled to the supply node and, during operation of the apparatus, when the source of the second source follower transistor is biased with the operating voltage at the supply node to cause the second source follower transistor to turn ON, the second source follower transistor changes the operating voltage and the change in the operating voltage at the supply node causes the first source follower transistor to automatically turn OFF.

34. The apparatus of claim 33 further comprising a load coupled to the switching power converter.

35. The apparatus of claim 34 wherein the load comprises one or more members of a group consisting of one or more light emitting diodes, one or more fluorescent light sources, one or more motors, and one or more portable power sources.

36. The apparatus of claim 33 wherein gates of the first and second source follower transistors have an identical bias voltage during operation of the apparatus.

37. The apparatus of claim 33, wherein the operating voltage for the controller is a regulated, direct current (DC) voltage.

38. The apparatus of claim 13 wherein the circuit element comprises a diode.

* * * * *